United States Patent

Shinoda et al.

[11] Patent Number: 5,805,316
[45] Date of Patent: Sep. 8, 1998

[54] TWIN-IMAGE ELIMINATION APPARATUS AND METHOD

[75] Inventors: Kazunori Shinoda, Hamamatsu, Japan; Ting-Chung Poon, Blacksburg, Va.; Ming Hsien Wu, Woodbridge, N.J.; Yoshiji Suzuki, Hamamatsu, Japan

[73] Assignees: Hamamatsu Photonics K.K., Hamamatsu, Japan; Virginia Tech Intellectual Properties, Inc., Blacksburg, Va.

[21] Appl. No.: 705,971

[22] Filed: Aug. 30, 1996

[30]   Foreign Application Priority Data

Aug. 31, 1995 [JP] Japan .................................. 7-223614

[51] Int. Cl.⁶ .................................................. G03H 1/22
[52] U.S. Cl. .................................. 359/33; 359/1; 359/10; 359/32; 348/40
[58] Field of Search .............................. 359/1, 9, 10, 11, 359/32, 33, 35; 348/40, 41

[56]            References Cited

U.S. PATENT DOCUMENTS 3,856,986  12/1974  Macovski ................................. 348/40
4,376,950   3/1983  Brown et al. ............................ 359/33
5,064,257  11/1991  Shinoda et al. ......................... 348/40

OTHER PUBLICATIONS

Poon et al: "Three–dimensional microscopy by optical scanning holography", Optical Engineering, May 1995, vol. 34, No. 5, pp. 1338–1344.

*Primary Examiner*—Jon W. Henry
*Assistant Examiner*—Darren E. Schuberg
*Attorney, Agent, or Firm*—Cushman Darby & Cushman IP Group of Pillsbury Madison & Sutro LLP

[57]            ABSTRACT

The twin-image elimination apparatus of the present invention comprises (a) a scanning light source for emitting a scanning light beam; (b) an interference device which converts the scanning light beam from the scanning light source into a spherical wave and a plane wave having temporal frequencies different from each other and combines the spherical and plane waves together; (c) a scanner for scanning an object with the combined light beam from the interference device; (d) a photodetector for detecting a scattered wave from the object; (e) a first multiplier which converts an output signal of the photodetector into a cosine-coded holographic information; (f) a second multiplier which converts the output signal of the photodetector into a sine-coded holographic information; and (g) a holographic reconstruction device which converts output signals of the first and second multipliers into a sum signal, in which these output signals are added together with a phase difference of $\pi/2 + 2n\pi$ (wherein n is an integer not less than 0), so as to reproduce an image of the object without the presence of its twin image. Hence, at the time of reconstructing a hologram, the virtual image component contained in the output signal of the photodetector can be removed, thereby improving the image quality of the reconstructed image.

20 Claims, 9 Drawing Sheets

TWIN-IMAGE ELIMINATION APPARATUS AND METHOD

BACKGROUND OF THE INVENTION

1. Field of the Invention

The present invention relates to a twin-image elimination apparatus and method for improving an image quality of a holographic image.

2. Related Background Art

As an apparatus in which an object to be subjected to holographic recording is irradiated with a scanning light beam and then information concerning the phase and amplitude of the reflected wave from the object is stored, there has conventionally been known as "Optical Heterodyne Scanning Type Holography Device" disclosed in U.S. Pat. No. 5,064,257. In this apparatus, a laser beam comprising a plane wave and a spherical wave having frequencies slightly different from each other is interfered to form a Fresnel zone plate, with which the surface of the object to be subjected to holographic recording is scanned. The scattering light from the object, which includes information concerning the reflection intensity and phase (i.e., a hologram) of the surface of the object, is captured by a photodetector and photoelectrically converted so as to display the hologram on a crystal of such means as an electron-beam addressed spatial light modulator which is synchronized with the above-mentioned scanning. When such obtained hologram is irradiated with a flat laser beam, a holographic image is reproduced.

SUMMARY OF THE INVENTION

The objective of the present invention is to realize twin-image elimination apparatus and method in which, in order to eliminate a twin image comprising a real image and a virtual image generated in front and behind of a hologram surface when the hologram is illuminated, either the real or virtual image is eliminated so as to improve the image quality of the reproduced image.

In order to attain the above objective, the twin-image elimination apparatus of the present invention comprises: (a) a scanning light source for emitting a light beam for scanning an object therewith; (b) an interference means which converts the scanning light beam emitted from the scanning light source into a spherical wave and a plane wave having temporal frequencies different from each other and combines the spherical and plane waves together; (c) a scanner (e.g., scanner mirror and its driving device) for scanning the object with the combined light beam generated by the interference means; (d) a photodetector for detecting a scattered wave emitted from the object; (e) a first multiplier which receives an output signal of the photodetector and converts the output signal of the photodetector into a cosine-coded hologram; (f) a second multiplier which receives an output signal of the photodetector and converts the output signal of the photodetector into a sine-coded hologram; and (g) an object image reproduction means (a holographic reconstruction means) which converts output electrical signals of the first and second multipliers into a sum signal, in which the output signals of the first and second multipliers are added together with a phase difference of $\pi/2+2n\pi$ (wherein n is an integer not less than 0), so as to synthesize a hologram of which an image of the object can be reconstructed without the twin image.

In the twin-image elimination apparatus, according to the findings of the inventors, a signal in which the output signal of the photodetector has been converted into a sine-coded hologram (referred to as "sine-coded signal" in the following), is added with a phase difference of $\pi/2+2n\pi$ (wherein n is an integer not less than 0), to a signal in which the output signal of the photodetector has been converted into a cosine-coded hologram (referred to as "cosine-coded signal" in the following). When an object is reconstructed on the basis of the sum of the two signals, either the real or virtual image can be removed, thereby eliminating the twin image in holography.

A first mode of the above-mentioned holographic reconstruction means comprises: a first spatial light modulator in which a first holographic information data of the object is recorded on the basis of the output signal of the first multiplier; a second spatial light modulator in which a second holographic information data of the object is recorded on the basis of the output signal of the second multiplier; a read-out light source for emitting a read-out light beam to the first and second spatial light modulators; and a phase control means for generating a phase difference of $\pi/2+2n\pi$ (wherein n is an integer not less than 0) between the read-out light beam modulated by the first spatial light modulator and the read-out light beam modulated by the second spatial light modulator, thereby combining the read-out light beams modulated by the first and second spatial light modulators together so as to reconstruct the hologram of the object on the basis of the first and second holographic information data of the object.

The above-mentioned phase control means may modulate the phase of the read-out light beam before modulation as well as that after modulation. Also, the holographic reconstruction means in accordance with the above-mentioned first mode may further comprise an optical beam splitter which divides the read-out light beam emitted from the read-out light source into two branched beams and outputs the two branched beams respectively toward the first and second spatial light modulators, while receiving and combining the light beams emitted from the first and second spatial light modulators.

In the twin-image elimination apparatus provided with the holographic reconstruction means in accordance with the first mode, the read-out light beam is modulated by the first and second spatial light modulators, whereby the holographic information of the object recorded in these spatial light modulators is reconstructed at the wave front of the modulated read-out light beam. Then, as the two modulated read-out light beams are combined together while their phase relationship is adjusted by the above-mentioned phase control means, a process for adding the sine-coded signal to the cosine-coded signal with a phase difference of $\pi/2+2n\pi$ (wherein n is an integer not less than 0) is achieved, thereby reconstructing a holographic image with either its real or virtual image being eliminated.

Also, the twin-image elimination apparatus in accordance with the present invention may further comprise a transmitter for transmitting the output signal of the photodetector and a receiver which receives the output signal of the photodetector transmitted by this transmitter and outputs thus received signal to the first and second multipliers.

In this case, since the output signal of the photodetector is transmitted to the first and second multipliers by way of the transmitter and the receiver, even when the object and its holographic reconstruction means are disposed in separate rooms, a hologram image can be reconstructed.

A second mode of the holographic reconstruction means comprises: a first memory unit which stores a first holographic information of the object based on the output signal of the first multiplier; a second memory unit which stores a second holographic information of the object based on the output signal of the second multiplier; a processing means for adding the first holographic information of the object stored in the first memory unit to the second holographic information of the object stored in the second memory unit with a phase difference of $\pi/2+2n\pi$ (wherein n is an integer not less than 0); and a display device which converts an output electric signal of the processing means into a reconstructed image so as to be displayed as the image of the object thereon.

In the twin-image elimination apparatus provided with the holographic reconstruction means in accordance with the second mode, the processing means reads out the output signals of the first and second multipliers, namely, the cosine-coded signal and the sine-coded signal, respectively from the first and second memory units and then adds the sine-coded signal to the cosine-coded signal with a phase difference of $\pi/2+2n\pi$ (wherein n is an integer not less than 0). As the result of this operation is fed to the display device, a hologram image is reproduced with one of its real and virtual images being eliminated.

The twin-image elimination apparatus provided with the holographic reconstruction means in accordance with the second mode may further comprise a transmitter for transmitting the output electric signal of the processing means and a receiver which receives the output electric signal of the processing means transmitted by this transmitter and outputs thus received signal to the display device.

In this case, since the output electric signal of the processing means is transmitted to the display device by way of the transmitter and the receiver, even when the processing means and the display device are disposed in separate rooms, a hologram image can be reconstructed.

In order to achieve the above-mentioned objective, the twin-image elimination method in accordance with the present invention comprises (a) a first phase in which an object-scanning light beam emitted from a scanning light source is converted, by an interference means, into a combined light beam comprising a spherical wave and a plane wave which have temporal frequencies different from each other, and the spherical and plane waves are combined together by said interference means; (b) a second phase in which an object is scanned by a scanner with the combined light beam emitted from the interference means; (c) a third phase in which a scattered wave emitted from the object is detected by a photodetector, and an output signal of the photodetector is converted into a cosine code by a first multiplier, while this output signal of the photodetector is converted into a sine code by a second multiplier; and (d) a fourth phase in which output signals of the first and second multipliers are converted into a sum signal, in which the output signals of the first and second multipliers are added together with a phase difference of $\pi/2+2n\pi$ (wherein n is an integer not less than 0) by an object image reproducing means (a holographic reconstruction means) to create a hologram, so as to reconstruct an image of the object without its twin image.

In the twin-image elimination method, according to the findings of the inventors, a signal in which the output signal of the photodetector has been converted into a sine-coded hologram, i.e., sine-coded signal, is added, with a phase difference of $\pi/2+2n\pi$ (wherein n is an integer not less than 0), to a signal in which the output signal of the photodetector has been converted into a cosine-coded hologram, i.e., cosine-coded signal. When an object is reconstructed on the basis of the sum of the two signals, either the real or the virtual image can be removed, thereby eliminating a twin image.

A first mode of the above-mentioned fourth phase comprises: a first step in which a first holographic information of the object is recorded by a first spatial light modulator on the basis of the output signal of the first multiplier, while a second holographic information of the object is recorded by a second spatial light modulator on the basis of the output signal of the second multiplier; a second step in which a read-out light beam emitted from a read-out light source is modulated by the first and second spatial light modulators, while a phase modulating means generates a phase difference of $\pi/2+2n\pi$ (wherein n is an integer not less than 0) between the read-out light beam modulated by the first spatial light modulator and the read-out light beam modulated by the second spatial light modulator; and a third step in which the read-out light beams modulated by the first and second spatial light modulators are combined together so as to reconstruct the image of the object on the basis of the first and second holographic information of the object.

Here, the second step may modulate the phase of the read-out light beam before modulation as well as that after modulation. Also, in the fourth phase in the above-mentioned first mode, the second step may divide the read-out light beam from the read-out light source into two branched beams by an optical beam splitter and output the two branched beams respectively to the first and second spatial light modulators, while, in the third step, the optical beam splitter may receive and combine the two branched light beams emitted from the first and second spatial light modulators.

In the twin-image elimination method provided with the fourth phase in accordance with the first mode, the read-out light beam is modulated by the first and second spatial light modulators, whereby the holographic information of the object recorded in these spatial light modulators is reproduced at the wave front of the modulated read-out light beam. Then, as the two modulated read-out light beams are combined together while their phase relationship is adjusted by the above-mentioned phase modulating means, a process for adding the sine-coded signal to the cosine-coded signal with a phase difference of $\pi/2+2n\pi$ (wherein n is an integer not less than 0) is achieved, thereby reproducing a holographic image with either the real or the virtual image being eliminated.

Also, in the twin-image elimination method in accordance with the present invention, in the third phase, a transmitter may be used for transmitting the output signal of the photodetector to a receiver and then a receiver may be used for receiving the output signal of the photodetector transmitted by this transmitter and outputting it to the first and second multipliers.

In this case, since the output signal of the photodetector is transmitted to the first and second multipliers by way of the transmitter and the receiver, even when the object and the holographic reconstruction means are disposed in separate rooms, a hologram image can be reproduced.

A second mode of the above-mentioned fourth phase comprises: a first step in which the output signal of the first multiplier is stored as a first holographic information of the object by a first memory unit, while the output signal of the second multiplier is stored as a second holographic information of the object in a second memory unit; a second phase in which the first holographic information of the object read out from the first memory unit and the second holographic information of the object read out from the second memory unit are added together by a processing means with a phase difference of $\pi/2+2n\pi$ (wherein n is an integer not less than 0); and a third step in which an output electric signal of the processing means is converted into an optical image by a display device so as to be displayed as the image of the object thereon.

In the twin-image elimination method provided with the fourth phase in accordance with the second mode, the processing means reads out the output signals of the first and second multipliers, namely, the cosine-coded signal and the sine-coded signal, respectively from the first and second memory units and then adds the sine-coded signal to the cosine-coded signal with a phase difference of $\pi/2+2n\pi$ (wherein n is an integer not less than 0). As the result of this operation is fed to the display device, a hologram image is then reproduced with either its real or virtual image being eliminated.

The twin-image elimination apparatus provided with the fourth phase in accordance with the second mode, in the third step of the fourth phase, a transmitter may be used for transmitting the output electric signal of the processing means and then a receiver may be used for receiving the output electric signal of the processing means transmitted by this transmitter and outputting it to the display device.

In this case, since the output electric signal of the processing means is transmitted to the display device by way of the transmitter and the receiver, even when the processing means and the display device are disposed in separate rooms, a hologram image can be reproduced.

The present invention will be more fully understood from the detailed description given herein below and the accompanying drawings, which are given by way of illustration only and are not to be considered as limiting the present invention.

Further scope of applicability of the present invention will become apparent from the detailed description given herein after. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
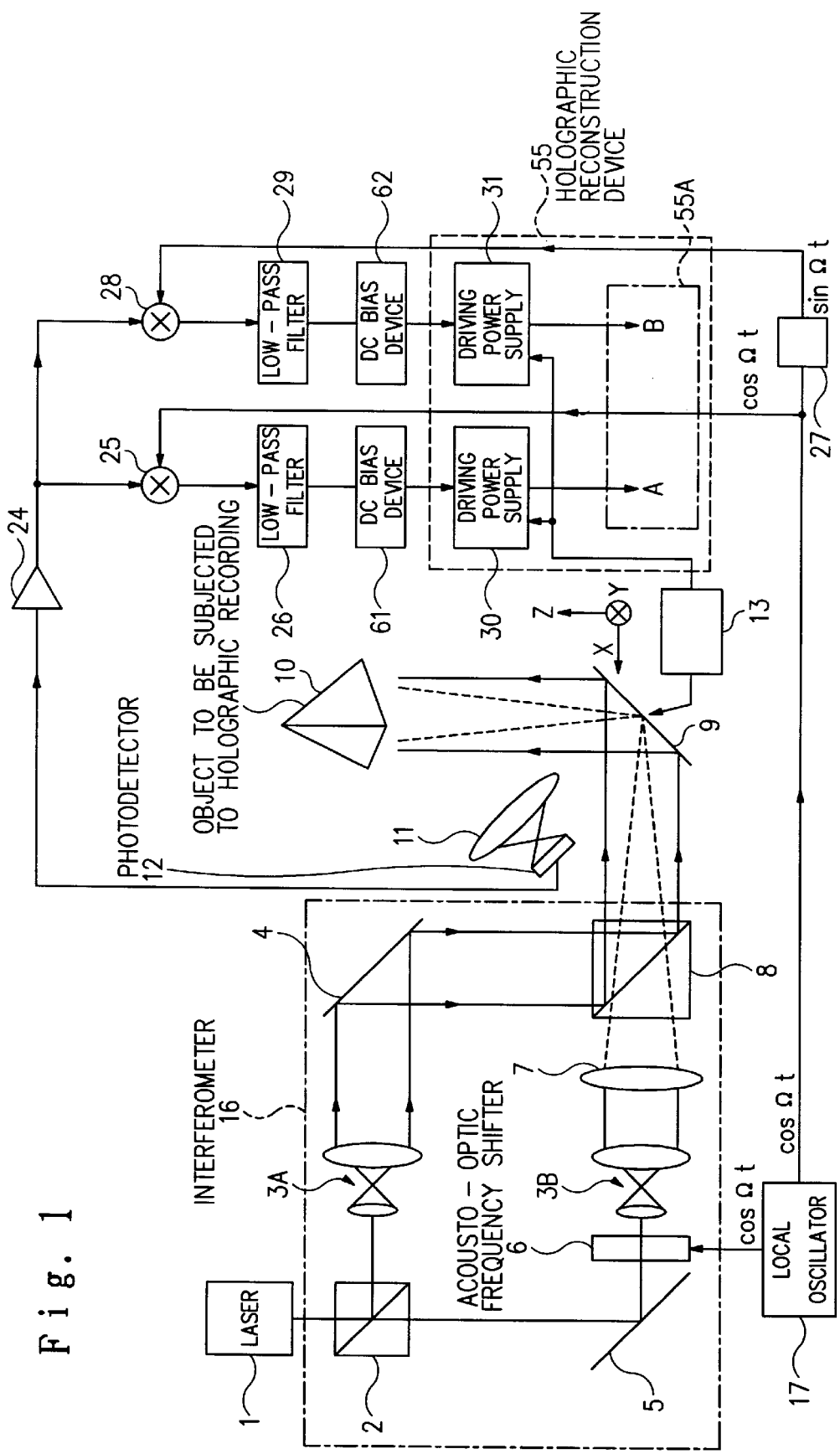
FIG. 1 is a diagram showing an overall configuration of a twin-image elimination apparatus in accordance with a first embodiment of the present invention.

In the following, configurations and effects of various embodiments concerning the twin-image elimination apparatus and method of the present invention will be explained in detail with reference to FIGS. 1 to 11. In the explanation of the drawings, identical elements are referred to with identical marks without repeating their overlapping explanations. Also, dimensional ratios in the drawings do not always correspond to their explanations.

First Embodiment

As shown in FIG. 1, the twin-image elimination apparatus in this embodiment is mainly composed of a laser 1, an interferometer 16, a 2-D scanner mirror 9, a driving circuit 13 for the 2-D scanner mirror 9, a photodetector 12, a first multiplier 25, a second multiplier 28, and a holographic reconstruction device 55. It further comprises a local oscillator 17, a phase shifter 27, a condenser lens 11, an amplifier 24, two low-pass filters 26 and 29, and two DC bias devices 61 and 62. Also, in FIG. 1, an object to be subjected to holographic recording by which a hologram image is formed is indicated by 10.

The laser (scanning light source) 1 is a light source oscillating at a frequency ω. This light beam is used for scanning the object 10 therewith. The interferometer (interference means) 16 is constituted by two beam splitters 2 and 8, two beam expanders 3A and 3B, two mirrors 4 and 5, an acousto-optic frequency shifter 6, and a focusing lens 7.

The beam splitter 2 is an optical device which transmits a half of the incident light beam while reflecting the other half so as to branch the incident light beam into two beams respectively emitted in two directions orthogonal to each other. It is disposed on the optical path of the laser light beam oscillated by the laser 1. The two beam expanders 3A and 3B are optical devices which expand the incident light beam with an enlarged beam diameter. The beam expander 3A is disposed on the optical path of one of the laser beams branched by the beam splitter 2. The beam expander 3B is disposed on the optical path of the light beam emitted from the acousto-optic frequency shifter 6.

The two mirrors 4 and 5 reflect the incident light beam with a high reflectivity. The mirror 4 is disposed on the optical path of the light beam emitted from the beam expander 3A. The mirror 5 is disposed on an optical path which is different from the path directed to the beam expander 3A in the two optical paths set by the beam splitter 2, such that the light beam transmitted through the beam splitter 2 can be incident thereon.

The acousto-optic frequency shifter 6 is an optical device which, when a light beam with the frequency ω is incident thereon, shifts the frequency of the output light beam to $\omega+\Omega$. This acousto-optic frequency shifter 6 shifts the incident light beam on the basis of a local oscillation wave $\cos\Omega t$ applied thereto by the local oscillator 17. The focusing lens 7 is used for converging the light beam emitted from the beam expander 3B. The beam splitter 8 is used for combining (superposing) the light beams emitted from the mirror 4 and focusing lens 7 with each other and disposed such that both light beams emitted from the mirror 4 and focusing lens 7 are incident thereon.

The 2-D scanner mirror 9 is a reflecting mirror disposed directly downstream the interferometer 16 on the optical path of the laser beam emitted from the laser 1. It is used for reflecting the light beam combined by the beam splitter 8 such that the object 10 is irradiated therewith. The rotational axis of the 2-D scanner mirror 9 is in parallel to the Y axis shown in FIG. 1. The 2-D mirror 9 is disposed such that the focal point of the focusing lens 7 is positioned at the middle point of this rotational axis. Also, the rotational axis is swingable on the YZ plane.

The driving device 13 rotates the 2-D scanner mirror 9 around the above-mentioned rotational axis, while swinging this rotational axis as latter. As the 2-D mirror 9 is rotated, the combined light beam emitted from the beam splitter 8 can be swept in the X direction shown in FIG. 1. Also, as the rotational axis of the 2-D scanner mirror 9 is swung on the YZ plane, the combined light beam emitted from the beam splitter 8 can be swept in the Y direction shown in FIG. 1. As a result, when the driving device 13 rotates and swings the 2-D scanner mirror 9, the object 10 is scanned in the X and Y directions.

The photodetector 12 is a light-detecting device which photoelectrically converts the incident light and outputs a heterodyne current having a level corresponding to the instantaneous intensity of the scattered light from the object. It is used for detecting the light beam scattered by the object 10. As this photodetector 12, a general light-receiving device such as photomultiplier or photodiode can be used. Between the object 10 and the photodetector 12, the condenser lens 11 is disposed so as to make the light scattered by the object 10 condense on the photodetector 12.

The amplifier 24 amplifies the output signal of the photodetector 24. The output signal of the amplifier 24 is transmitted to the first and second multipliers 25 and 28. The first multiplier 25 multiplies the output signal of the amplifier 24 by the local oscillation wave $\cos\Omega t$ applied thereto by the local oscillator 17. The second multiplier 28 multiplies the output signal of the amplifier 24 by a signal of $\sin\Omega t$ which is generated when the local oscillation wave $\cos\Omega t$ generated by the local oscillator is converted by the phase shifter 27.

The two low-pass filters 26 and 29 transmit only the low frequency components of the output signals of the first and second multipliers 25 and 28, respectively. The two DC bias devices 61 and 62 apply direct bias current to the output signals of the low-pass filters 26 and 29, respectively. The output signals of the DC bias devices 61 and 62 are respectively transmitted to two driving power supplies 30 and 31 included in the holographic reconstruction device 55.

Figure 2:
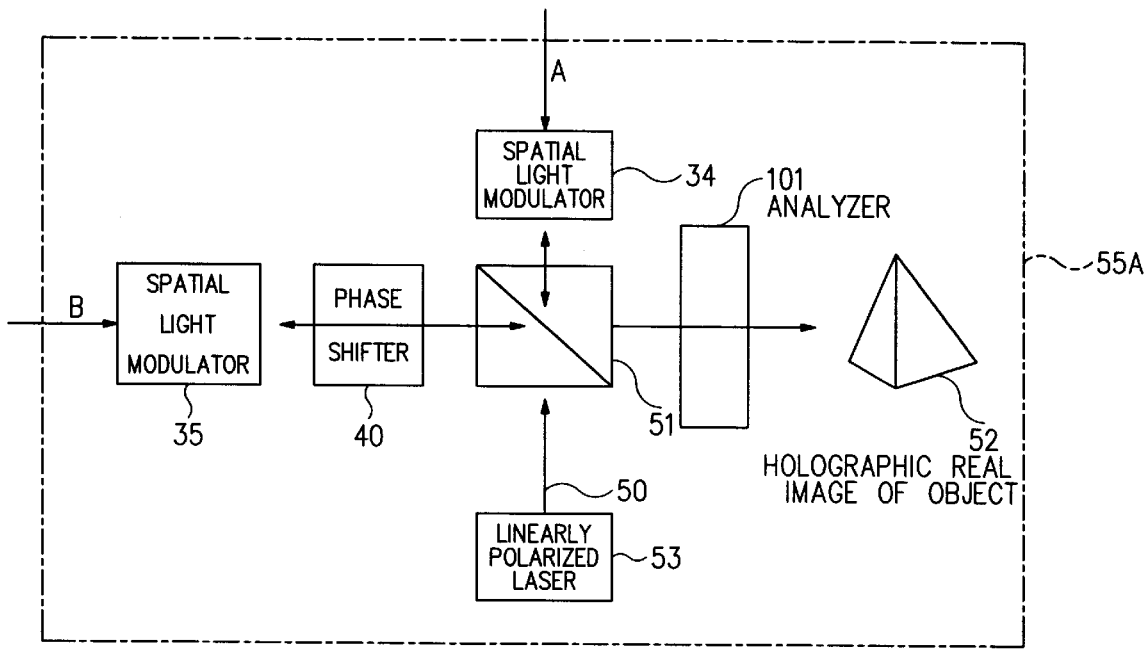
FIG. 2 is a diagram showing a partial configuration of the holographic reconstruction means in the twin-image elimination apparatus shown in FIG. 1.

The configuration of the portion of the holographic reconstruction device (holographic reconstruction means) 55 indicated by 55A in FIG. 1 is shown in FIG. 2. As shown in FIGS. 1 and 2, the holographic reconstruction device 55 is constituted by a first spatial light modulator 34, a second spatial light modulator 35, the driving power supply 30 for driving the first spatial light modulator 34, the driving power supply 31 for driving the second spatial light modulator 35, a phase shifter 40, an optical beam splitter 51, an analyzer 101, and a read-out light source 53. Each of the first and second spatial light modulators 34 and 35 is an electron beam addressed spatial light modulator (EBSLM) equipped with such elements as an electron gun, a focusing electrode, and an electro-optical crystal plate. They scan, on the basis of the driving voltage signals from the two driving power supplies 30 and 31, the electron beams irradiating the electro-optical crystal plate so as to form, on their electro-optical crystal plates, charge patterns corresponding to the hologram of the object 10, respectively. The analyzer 101 reads out a polarization of the laser beam modulated by the first and second spatial light modulators 34 and 35.

The read-out light source 53 emits a laser beam 50 for reading out these charge patterns. As the read-out light source 53, a linearly polarized laser can be used. The optical beam splitter 51 branches the laser beam 50 from the read-out light source 53 into two beams respectively incident on the first and second spatial light modulators 34 and 35, while combining the laser beams emitted from the first and second spatial light modulators 34 and 35 together. The phase shifter 40 is an optical device which advances the phase of the transmitting light by 45 degrees. It is disposed between the spatial light modulator 35 and the optical beam splitter 51. As the phase shifter 40, a Z-cut LiNbO$_3$ crystal utilizing Pockels effect, for example, can be used. It only changes the phase of the wave, not the polarization of the light.

In the following, the operation of this apparatus will be explained. First, the laser 1 is subjected to laser oscillation so as to output a laser beam having a frequency $\omega$. This laser beam enters the interferometer 16. The laser beam incident on the beam splitter 2 is branched into two beams respectively advancing toward the beam expander 3A and the mirror 5. The branched beam incident on the beam expander 3A enters, with an expanded beam diameter, the mirror 4 which then reflects the beam so as to make it incident on the beam 8 from the mirror 4 is a plane wave.

On the other hand, the branched beam incident on the mirror 5 is reflected thereby so as to enter the acousto-optic frequency shifter 6. The acousto-optic frequency shifter 6 outputs the branched beam with its angular frequency at $\omega+\Omega$. This laser beam emitted from the acousto-optic frequency shifter 6 enters the beam expander 3B and, after its beam diameter is expanded therein, enters the focusing lens 7. This laser beam advances, while being converged by the focusing lens 7, to enter the beam splitter 8. The laser beam diverges after the focus of the focusing lens 7 and therefore becomes a spherical wave. The beam splitter 8 combines the laser beams emitted from the mirror 4 and focusing lens 7 together and outputs thus combined laser beam. In this manner, the combined laser beam in which a laser beam (plane wave) having an angular frequency of $\omega$ and a laser beam (spherical wave) having an angular frequency of $\omega+\Omega$ are superposed is generated.

Thus generated laser beam enters the 2-D scanner mirror 9, by which it is then reflected toward the object 10. As the driving device 13 rotates and swings the 2-D scanner mirror 9, the object 10 is scanned with the above generated laser beam with intensity proportional to:

$$I(x,y) \sim |A \exp(jwt) + B \exp[j(k_0/2z)(x^2+y^2)] \exp[j(m+\Omega)t]|^2$$

wherein A and B denotes the amplitude of the plane wave and the spherical wave, respectively, $k_0=2\pi/\lambda$ ($\lambda$ being the wavelength of the laser beam), z is the distance measured away from the focal point of lens 7, and finally $j=(-1)^{0.5}$. The above laser beam intensity expression can be simplified to:

$$I(x,y) \sim A^2 + B^2 + 2AB \cos[(k_0/2z)(x^2+y^2) + \Omega t]$$

The light reflected and scattered by the surface of the object 10 upon scanning with such laser beam is received by the photodetector 12 by way of the condenser lens 11. The photodetector 12 photoelectrically converts the scattered light and outputs a heterodyne current at frequency $\Omega$ which has an amplitude corresponding to the intensity of the scattered light.

Here, in order to explain the holographic information of the object 10 carried by this heterodyne current, it is assumed that a point object $\delta(x-x_0, y-y_0)$ is disposed at a position of $z=z_0$ as the object 10. In this case, the above-mentioned heterodyne current $i_{scan}$ is expressed, by using $\theta(x,y) = (k_0/2z_0)[(x-x_0)^2 + (y-y_0)^2]$, as:

$$i_{scan}(x,y) = \cos[\theta(x,y) + \Omega t]$$

Here, in order to facilitate the explanation, amplitude of unity is used in the expression. Also, in the following expressions, unit amplitude will be used. The reason that the expression given by $i_{scan}(x,y)$ is presented is that the point object at $z_0$ is physically scanned by the laser beam intensity $I(x,y)$ and this action evokes convolution symbolically denoted by * and expressed as follows:

$$\delta(x-x_0, y-y_0) * I(x,y) \xrightarrow[\text{detection}]{\text{hetrodyne}} i_{scan}(x,y)$$

In the $i_{scan}(x,y)$, $x=x(t)$ and $y=y(t)$ are determined by the scanning movement effected by the 2-D scanner mirror 9. Also, the origin of the depth direction of the object 10, namely, the z-axis coordinate in FIG. 1, is placed at the rear-side focal point of the focusing lens 7. In the above expression, $\cos[\theta(x,y)]$ includes information of the depth direction $z_0$. In order to extract the phase $\theta(x,y)$ of the heterodyne current which carries the depth information of the object 10, the heterodyne current is subjected to a homodyne demodulation. Specifically, this homodyne demodulation is performed in the following manner.

Namely, the heterodyne current $\cos[\theta(x,y)+\Omega t]$ output from the photodetector 12 is amplified by the amplifier 24 and then multiplied at the first multiplier circuit 25 by the local oscillation wave $\cos\Omega t$ so as to be transmitted to the low-pass filter 26. The low-pass filter 26 transmits only the low-frequency component of the output signal of the multiplier circuit 25. The output of the low-pass filter 26 is fed to the DC bias device 61. This signal processing is expressed as follows:

$$\cos[\theta(x,y) + \Omega t]\cos\Omega t =$$

$$\frac{1}{2}\{\cos[\theta(x,y) + 2\Omega t] + \cos\theta(x,y)\} \xrightarrow{\text{low pass}} \cos\theta(x,y)$$

The DC bias device 61 applies a direct bias current to the current which has passed through the low-pass filter 26. The output signal $i_d$ of the DC bias device 61 is expressed as follows:

$$i_d(x,y) = 1 + \cos[\theta(x,y)]$$

Thus, the phase of the heterodyne current is extracted. The output signal of this DC bias device 61 is transmitted to the driving power supply 30.

In the conventional holography apparatus, the holographic information of the object 10 carried by the above-mentioned current $i_d$ recorded such a device as photographic films or spatial light modulators, which is then irradiated with a read-out laser beam, whereby the original spatial image is reproduced by its transmitted or reflected light. This operation is based on the fact that a recording pattern in the device itself represents a hologram of the above-mentioned point object, namely, an FZP (Fresnel zone plate), while the transmitted or reflected laser beam converges on the position $(x_0, y_0, z_0)$, whereby the original spatial image is reproduced.

In the conventional holography, however, a real image and a virtual image may be respectively formed in front and behind of the hologram surface at the same time. This phenomenon will be easily understood when the following modification is effected with respect to emitted from a read-out light source is modulated by the phase of the current $i_d$:

$$\cos\theta = \frac{1}{2}[\exp(j\theta) + \exp(-j\theta)]$$

The first term of this expression represents the real image, whereas the second term represents the virtual image. In the conventional holography apparatus, the real image and the virtual image may mingle into the reproduced image as their respective noises, thereby deteriorating the image quality.

In the twin-image elimination apparatus in accordance with this embodiment, in addition to $i_d(X,Y)$, a current having a phase which is advanced from that of the $i_d(x,y)$ by 90 degrees is generated in order to eliminate the virtual image $\exp(-j\theta)$. Specifically, the heterodyne current output from the photodetector 12 is amplified by the amplifier 24, while the local oscillation wave $\cos\Omega t$ is converted to $\sin\Omega t$ by the phase shifter 27. Then, by the second multiplier circuit 28, the output $\cos[(x,y)+\Omega t]$ of the amplifier 24 is multiplied by the output $\sin\Omega t$ of the phase shifter 27 and thus the multiplied signal is transmitted to the low-pass filter 29. The output signal of the multiplier circuit 28 is transmitted to the DC bias device 62 after its high-frequency component is removed by the low-pass filter 29. The foregoing signal processing is expressed as follows:

$$\cos[\theta(x,y) + \Omega t]\sin\Omega t =$$

$$\frac{1}{2}\{\sin[\theta(x,y) + 2\Omega t] - \sin\theta(x,y)\} \xrightarrow{\text{low pass}} \sin\theta(x,y)$$

The output signal of the multiplier circuit 28 is transmitted to the driving power source 31 after a direct bias current is superposed thereon at the DC bias device 62. The output signal $i_d^Q(x,y)$ of the DC bias device 62 is expressed as follows:

$$i_d^Q(x,y) = 1 + \sin\theta[(x,y)]$$

Now, $i_d(x,y)$ and $i_d^Q(x,y)$ are added according to the following manner:

$$i_c(x,y) = i_d(x,y) + j \cdot i_d^Q(x,y)$$
$$= [1+j] + \exp(j\theta)$$

As indicated by this expression, when the hologram image represented by the complex sum signal of $i_d(x,y)$ and $i_d^Q(x,y)$, whose phase is advanced from that of $i_d(x,y)$ by $\pi/2 + 2n\pi$ (n is an integer not lower than 0), only the real image of the object 10 is reproduced. Here, the right side of the above expression includes a DC term of $[1+j]$ which provides only a fixed brightness to the reproducing real image.

The foregoing processing is performed in this apparatus in the following manner. The two driving power supplies 30 and 31, after having been synchronized with the driving device (driving means) 13 for the 2-D scanner mirror 9, record the holographic information data A of the object 10 carried by the $i_d(x,y)$ and the holographic information data B of the object 10 carried by the $i_d{}^Q(x,y)$ in the first and second spatial light modulators 34 and 35, respectively. The respective holographic information data A and B are recorded as charge patterns on the electro-optical crystal plates included in the first and second spatial light modulators 34 and 35. Then, when the read-out light source 53 outputs the read-out laser beam 50, the light beam component of the laser beam 50 which has passed through the optical beam splitter 51 enters the first spatial light modulator 34 and then is spatially modulated on the basis of $i_d(x,y)$.

The light beam component of the laser beam 50 which has been reflected by the optical beam splitter 51 enters, after its phase is advanced by 45 degrees by means of the phase shifter 40, the second light modulator 35 which then spatially modulates it on the basis of $i_d{}^Q(x,y)$. Accordingly, the holographic information data carried by $i_d(x,y)$ and $i_d{}^Q(x,y)$ are read out by the laser beam 50, simultaneously.

The laser beams incident on the first and second spatial light modulators 34 and 35, after being modulated thereby, are reflected thereby so as to enter the optical beam splitter 51 again. The laser beam reflected by the second spatial light modulator 35 is made incident on the phase shifter 40 again and, after its phase is further advanced by 45 degrees therein, enters the optical beam splitter 51. As a result, the laser beam entering the optical beam splitter 51 from the spatial light modulator 35 corresponds to $i_d{}^Q(x,y)$ whose phase has advanced by 90 degrees from that of $i_d(x,y)$, namely, $j \cdot i_d(x,y)$.

The beam entering the optical beam splitter 51 from the first spatial light modulator 34 that is reflected by the optical beam splitter 51 and the beam entering the optical beam splitter 51 from the second spatial light modulator 35 that is transmitted through the optical beam splitter 51 are output onto the same optical path and combined together through the analyzer 101. In this manner, the addition processing of $i_d(x,y)+j \cdot i_d{}^Q(x,y)$ is optically performed. Thus combined beam reproduces only a real image 52 of the object 10 as a three-dimensional image, while completely eliminating its virtual image.

Accordingly, in this apparatus, a twin image of an object can be eliminated so as to reproduce a hologram image having an excellent image quality. Also, as the twin image is eliminated by this apparatus, additional effects such as those explained in the following can be attained.

Namely, when three-dimensional television transmission is effected by conventional off-axis holographic techniques, there occurs a problem that its amount of information is so large that it may surpass the capacity of the transmission and image display systems. In view of this problem, it is now an urgent necessity to realize a technology for reducing the amount of information. While Leith-Upatnieks' off-axis technique has been used in the conventional holography apparatus (U.S. Pat. No. 5,064,257, Nov. 21, 1991, Optical Heterodyne Scanning Type Holography Device) in order to reduce the harmful effects of the twin image, a spatial light modulator having a high resolution has been necessary for realizing this technique. Also, it has been necessary for the transmission system to have an enormous bandwidth.

Figure 3:
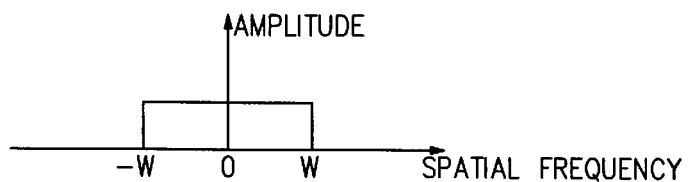
FIG. 3 shows a spectrum of the object subjected to holographic recording in the twin-image elimination apparatus shown in FIG. 1.
Figure 4:
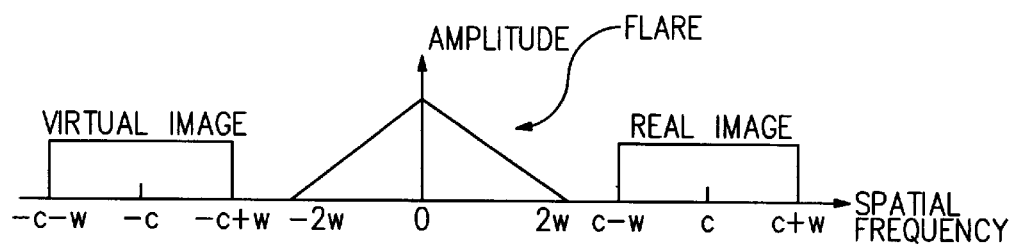
FIG. 4 shows a spectrum of a hologram obtained by conventional off-axis technique based on the spectrum of the object subjected to holographic recording shown in FIG. 3.

When the scattered light emitted from the object 10 has a spectrum with a bandwidth 2W such as that shown in FIG. 3, the spectrum of information recorded on the hologram obtained by the off-axis technique is such as that shown in FIG. 4. In order to separate the flare light and the object spectrum from each other, the transmission channel $C \geq 3W$ must have for at least bandwidth of $2(C+W) \geq 2(3W+W) = 8W$ (four times the bandwidth of the original spectrum of the object).

Figure 5:
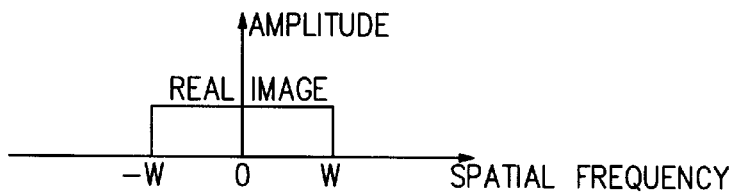
FIG. 5 shows a spectrum of a hologram obtained by the twin-image elimination apparatus shown in FIGS. 1 and 2, based on the spectrum of the object subjected to holography shown in FIG. 3.

In a system using the twin-image elimination apparatus of the present invention, the problem of the twin image is prevented without necessitating any spatial carrier. Accordingly, since carrier wave C=0, the transmission bandwidth can be set to 2W such as that shown in FIG. 5, which is the bandwidth of the object, thereby greatly reducing the bandwidth requirement of the transmission channel if holographic information is transmitted through it. Note that the spectrum due to the flare light as shown in FIG. 5 now does not occupy any bandwidth as the hologram is $i_c(x,y)=[1+j]+\exp(j\theta)$. The flare term $[1+j]$ is constant which translates to a zero bandwidth. As a result, television transmission bandwidth of holographic information can be reduced. Thus, the twin-image elimination apparatus of the present invention is also suitably used when the three-dimensional television transmission is effected by holographic techniques.

Here, in the apparatus of this embodiment, when the phase shifter 40 retards the phase of the passing wave front by 90 degrees, since $e^{-j\pi/2}=-j$, the following equation is established:

$$i_c(x,y) = i_d(x,y) - j \cdot i_d{}^Q(x,y)$$
$$= [1-j] + \exp(-j\theta)$$

Accordingly, only the virtual image is reproduced.

While the phase shifter 40 is used for advancing the phase of $i_d{}^Q(x,y)$, the relative relationship in distance of the optical path length from the optical beam splitter 51 to the first spatial light modulator 34 and the optical path length from the optical beam splitter 51 to the second spatial light modulator 35 with respect to each other may be adjusted so as to advance the phase of $i_d{}^Q(x,y)$. A device for translating the spatial light modulators toward or away from the beam splitter 51 may be provided for adjusting the relative relationship of the two optical path lengths.

Second Embodiment

Figure 6:
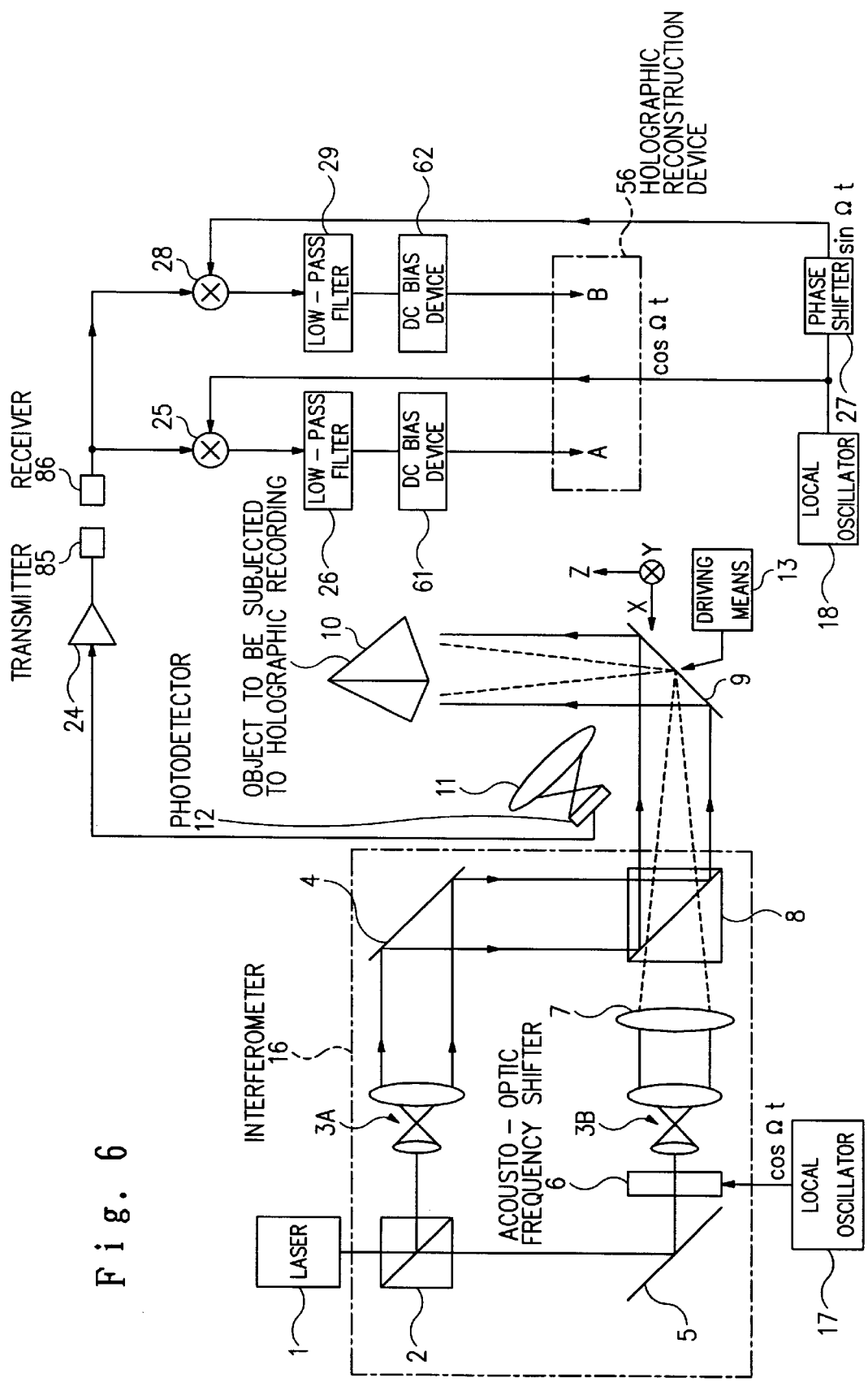
FIG. 6 is a diagram showing an overall configuration of a twin-image elimination apparatus in accordance with a second embodiment of the present invention.

As shown in FIG. 6, in the configuration of the twin-image elimination apparatus in accordance with this embodiment, the twin-image elimination apparatus of the first embodiment is altered so as to be used for holographic transmission. In this apparatus, a wireless transmitter 85 is connected to the output terminal of the amplifier 24, while a receiver 86, which forms a pair with the transmitter 85, is connected to the input terminals of the first and second multipliers 25 and 28. Also, in this apparatus, in addition to the local oscillator 17, a local oscillator 18 for applying the local oscillation wave $\cos\Omega t$ to the second multiplier 25 and phase shifter 27 is provided. The output signal of the photodetector 12 is wirelessly transmitted from the transmitter 85 to the receiver 86 so as to be output to the first and second multipliers 25 and 28, whereby wireless holographic transmission is effected.

Figure 7:
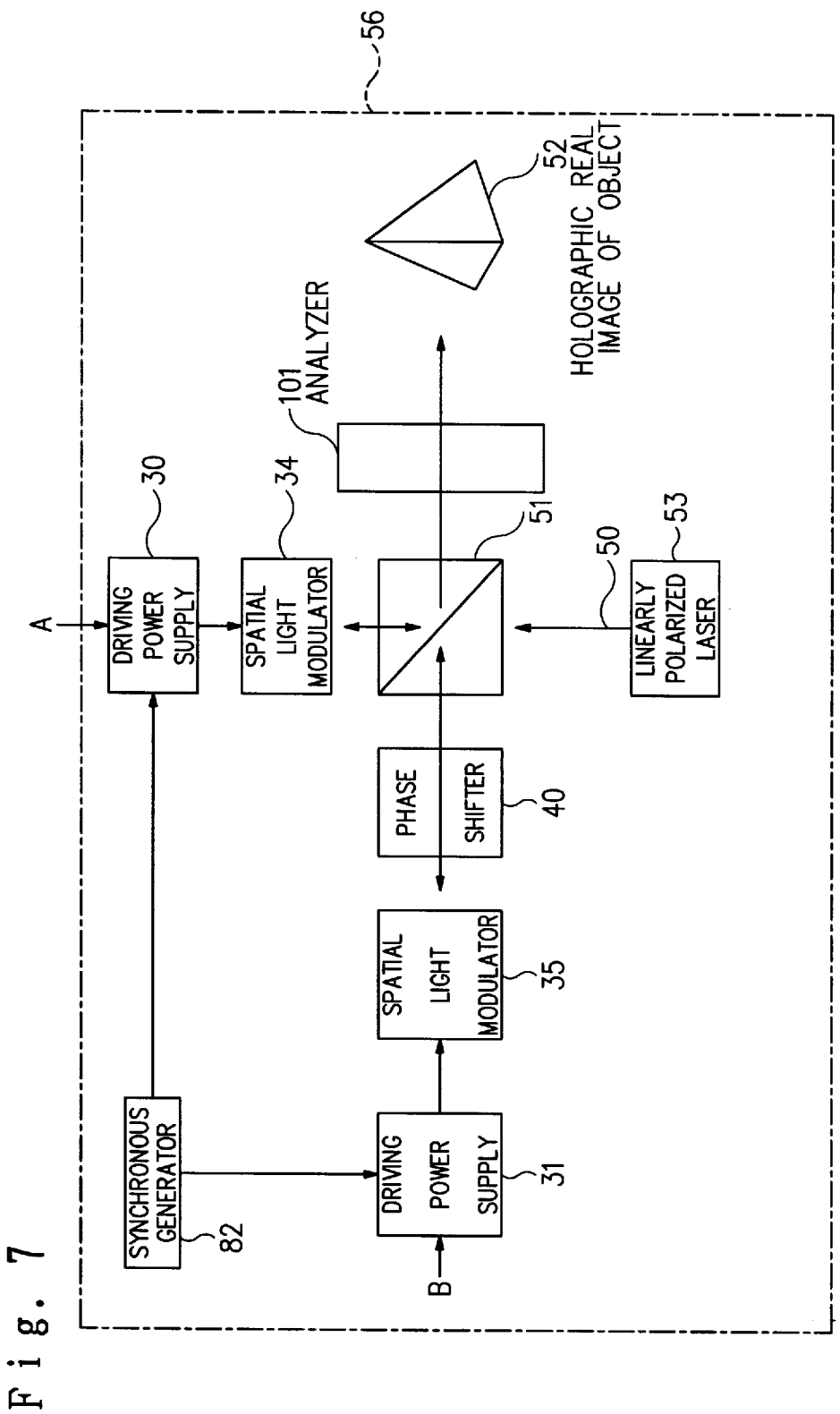
FIG. 7 is a diagram showing a detailed configuration of the object image reproducing means in the twin-image elimination apparatus shown in FIG. 6.

Also, in this apparatus, the configuration of its object image reproducing device 56 is different from that of the object image reproducing apparatus 55 in the first embodiment. As shown in FIG. 7, the holographic reconstruction device (holographic reconstruction means) 56 further comprises a synchronous generator 82 connected to the two driving power supplies 30 and 31 in addition to the constituents of the holographic reconstruction device 55 of the first embodiment. While the two driving power supplies 30 and 31 are actuated by the synchronization signal output from the driving power supply 13 in the first embodiment, they are actuated by the synchronization signal output from the synchronous generator 82 in this embodiment.

In the twin-image elimination apparatus in this embodiment, since the apparatus is divided into two parts by using the transmitter 85 and the receiver 86, a holographic image can be reproduced at a room which is different from a room where the object 10 is located. Here, in order to effect holographic transmission, in place of the transmitter 85 and the receiver 86, cables may be used for connecting the amplifier 24 to the first and second multipliers 25 and 28. In this case, long-distance holographic transmission can be easily realized when the cables are extended.

Third Embodiment

Figure 8:
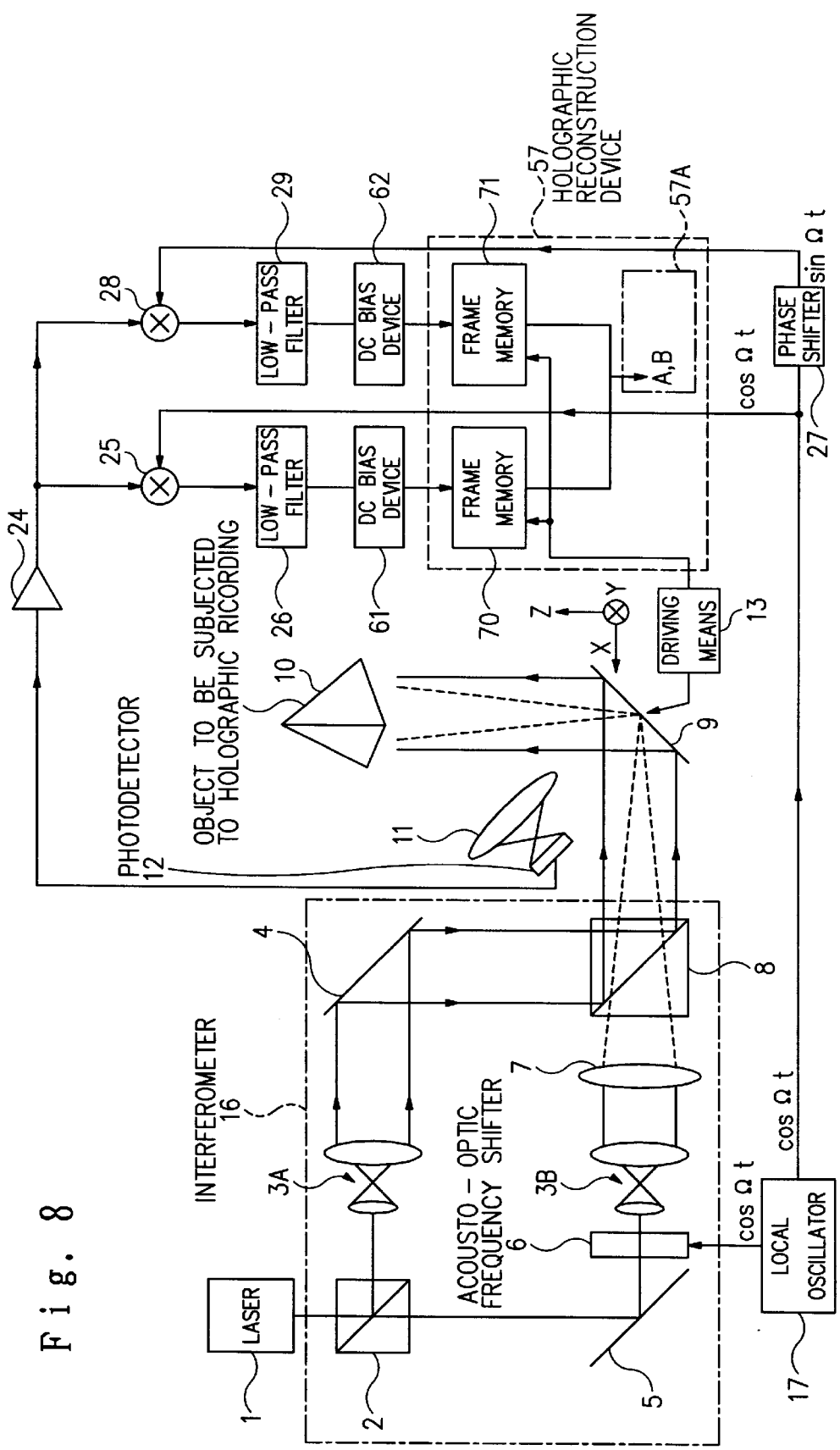
FIG. 8 is a diagram showing an overall configuration of a twin-image elimination apparatus in accordance with a third embodiment of the present invention.

As shown in FIG. 8, in the configuration of the twin-image elimination apparatus of this embodiment, unlike the apparatuses of the first and second embodiments, without using a spatial light modulator, a computer is used to reproduce a holographic image of the object 10. In this apparatus, the output $i_d(x,y)$ of the DC bias device 61 and the output $i_d^Q(x,y)$ of the DC bias device 62 are respectively transmitted to two frame memories 70 and 71 included in its holographic reconstruction device 57 and stored therein.

Figure 9:
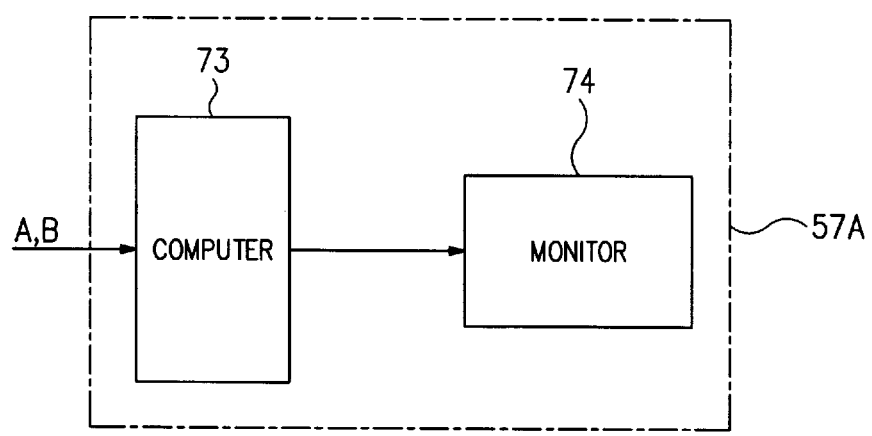
FIG. 9 is a diagram showing a partial configuration of the holographic reconstruction means in the twin-image elimination apparatus shown in FIG. 8.

In the holographic reconstruction device 57, the configuration of the portion indicated by 57A in FIG. 8 is shown in FIG. 9. As shown in FIGS. 8 and 9, the holographic reconstruction device (object image reproducing means) 57 comprises the first frame memory 70, the second frame memory 71, a computer 73 connected to these memories 70 and 71, and a monitor 74 connected to the computer 73. The first frame memory (first memory means) 70 and the second frame memory (second memory means) 71 output, at timings synchronized by the driving power supply 13, the two currents of $i_d(x,y)$ and $i^Q(x,y)$ to the computer 73. The $i_d(x,y)$ and $i_d^Q(x,y)$ signals are added together pixel by pixel in the computer 73, according to the equation given below:

$$i_c(x,y) = i_d(x,y) + j \cdot i_d^Q(x,y) = [1 + j] + \exp(j^\theta)$$

Also, the computer (processing means) 73 performs the following calculation:

$$i_c(x,y)*h(x,y;z)$$

wherein $h(x,y,z) = \exp[-j(k_0/2z)(x^2+y^2)]$.

When the calculation is effected by using $h(x,y;z=z_0)$ with respect to the point object $\delta(x-x_0, y-y_0)$ positioned at $z=z_0$, the following equation is established:

$$f(x,y) = \text{constant} + \delta(x-x_0, y-y_0)$$

whereby the original object image is reconstructed. The monitor (display device) 74 outputs the result of calculation f(x,y) on its display, thereby reproducing one slice of the 3D holographic image of the object 10. Also, according to this apparatus, when the calculation is effected with varied z values in the filter function h(x,y;z) in the above equation, different slice of the object along depth can be displayed.

Fourth Embodiment

Figure 10:
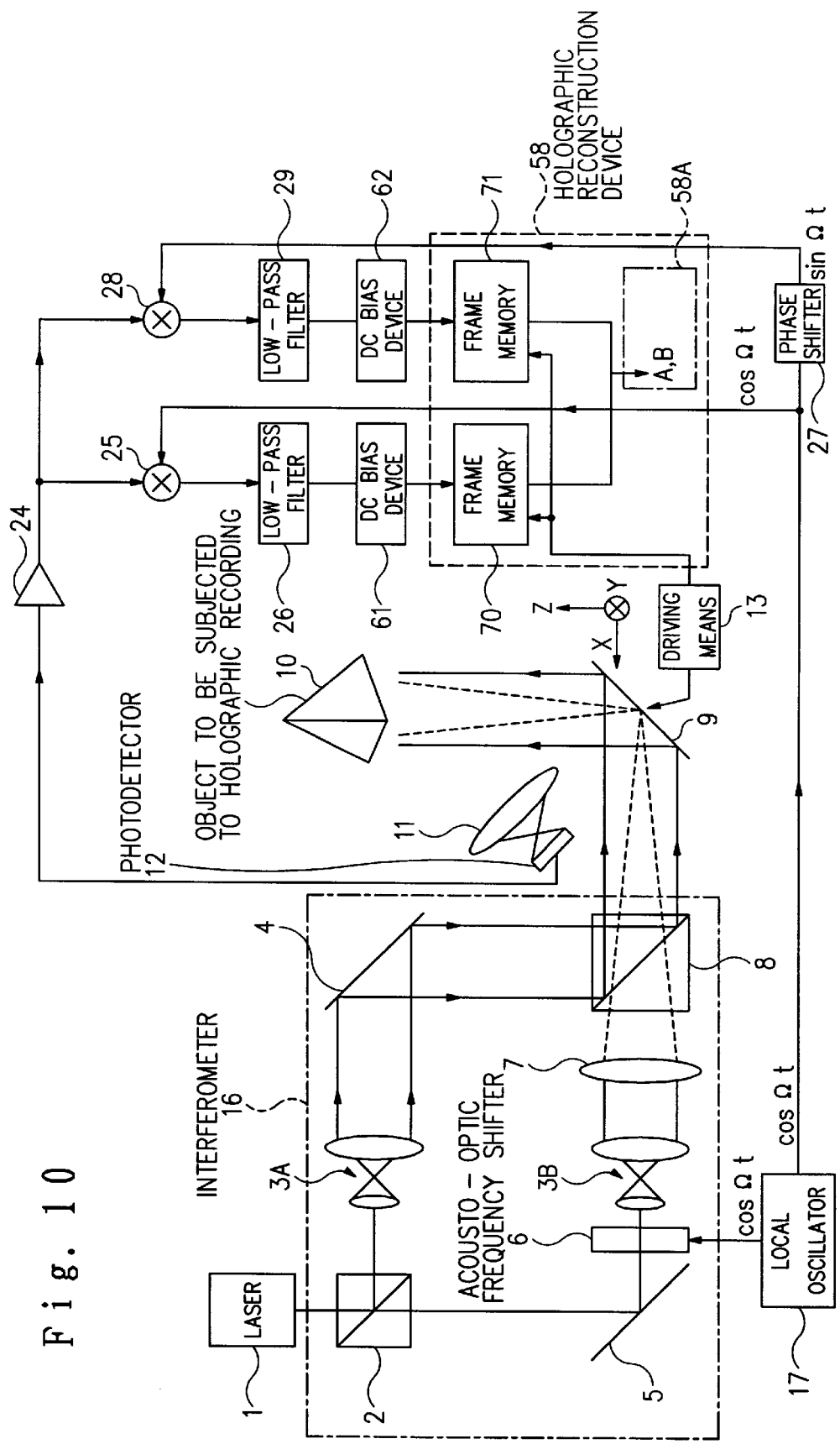
FIG. 10 is a diagram showing an overall configuration of a twin-image elimination apparatus in accordance with a fourth embodiment of the present invention.

As shown in FIG. 10, the twin-image elimination apparatus of this embodiment, like that of the third embodiment, uses a computer to reproduce a holographic image. However, the configuration of its holographic reconstruction device 58 differs from that of the third embodiment.

Figure 11:
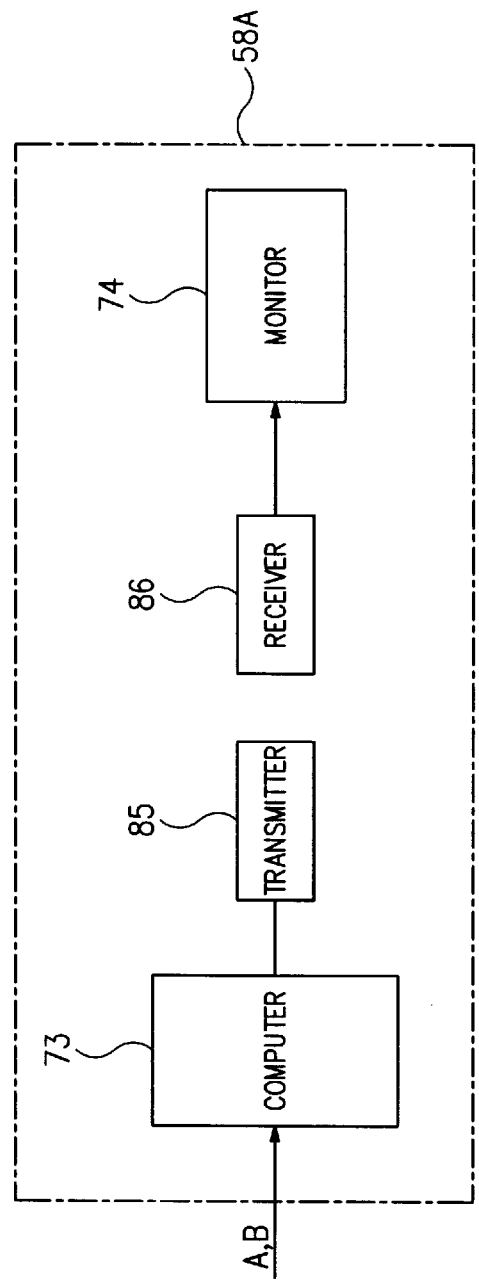
FIG. 11 is a diagram showing a partial configuration of the holographic reconstruction means in the twin-image elimination apparatus shown in FIG. 10.

The portion of the holographic reconstruction device 58 indicated by 58A in FIG. 10 is shown in FIG. 11. As shown in FIGS. 10 and 11, in the holographic reconstruction device (holographic reconstruction means) 58, a wireless transmitter 85 is connected to the computer 73, while a receiver 86, which forms a pair with the transmitter 85 is connected to the input terminal of the monitor 74. The result of calculation by the computer 73 is wirelessly transmitted from the transmitter 85 to the receiver 86. When the transmission side including the computer 73 and the transmitter 85 is placed in a room different from a room where the receiving side including the receiver 86 and the monitor 74 is located, a holographic image can be viewed at a room distanced from a room where the object 10 is located. Also, in place of the transmitter 85 and the receiver 86, cables may be used for connecting the computer 73 to the monitor 74. In this case, long-distance holographic transmission can be easily realized when the cables is extended.

As explained in detail in the foregoing, in accordance with the twin-image elimination apparatus and method of the present invention, the virtual image component contained in the output signal of the photodetector can be removed, thereby eliminating a twin image and reproducing a holographic image with an excellent image quality.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 223614/1995 (7-223614) filed on Aug. 31, 1995, is hereby incorporated by reference.

What is claimed is:

1. A twin-image elimination apparatus comprising:
   a scanning light source for emitting a light beam for scanning an object therewith;
   an interference means which converts the scanning light beam emitted from said scanning light source into a spherical wave and a plane wave having temporal frequencies different from each other and combines the spherical and plane waves together;
   a scanner for scanning the object with the combined light beam generated by said interference means;
   a photodetector for detecting a scattered wave emitted from the object;
   a first multiplier which receives an output signal of said photodetector and converts the output signal of said photodetector into a cosine-coded holographic information;
   a second multiplier which receives an output signal of said photodetector and converts the output signal of said photodetector into a sine-coded holographic information; and
   a holographic reconstruction means which converts output signals of said first and second multipliers into a sum signal, in which the output signals of said first and second multipliers are added together with a phase difference of $\pi/2+2n\pi$ (wherein n is an integer not less than 0), so as to reproduce an image of the object without its twin-image reconstruction.

2. A twin-image elimination apparatus according to claim 1, wherein said holographic reconstruction means comprises:
   a first spatial light modulator in which a first holographic information data of the object is recorded on the basis of the output signal of said first multiplier;
   a second spatial light modulator in which a second holographic information data of the object is recorded on the basis of the output signal of said second multiplier;

a read-out light source for emitting a read-out light beam to said first and second spatial light modulators; and a phase modulating means for generating a phase difference of $\pi/2+2n\pi$ (wherein n is an integer not less than 0) between the read-out light beam modulated by said first spatial light modulator and the read-out light beam modulated by said second spatial light modulator, wherein the read-out light beams modulated by the first and said second spatial light modulators are combined together so as to reproduce or reconstruct the image of the object on the basis of the first and second holographic information data of the object.

3. A twin-image elimination apparatus according to claim 2, wherein said holographic reconstruction means further comprises an optical beam splitter which divides the read-out light beam emitted from said read-out light source into two branched beams and outputs the two branched beams respectively toward said first and second spatial light modulators, while receiving and combining the two branched light beams emitted from said first and second spatial light modulators.

4. A twin-image elimination apparatus according to claim 3, wherein said phase modulating means changes the phase of the read-out light beam emitted from said read-out light source by $\pi/4$ each time the read-out light beam passes through one of a space between said first spatial light modulator and said optical beam splitter and a space between said second spatial light modulator and said optical beam splitter.

5. A twin-image elimination apparatus according to claim 2, further comprising a control means for synchronizing storage of the first and second holographic information data of the object in said first and second spatial light modulators with scanning of the object with the combined beam emitted from the interference means by said scanner.

6. A twin-image elimination apparatus according to claim 1, further comprising:

a transmitter for transmitting the output signal of said photodetector; and a receiver which receives the output signal of said photodetector transmitted by said transmitter and outputs thus received signal to said first and second multipliers.

7. A twin-image elimination apparatus according to claim 6, wherein said holographic reconstruction means comprises:

a first spatial light modulator in which a first holographic information data of the object is recorded on the basis of the output signal of said first multiplier;

a second spatial light modulator in which a second holographic information data of the object is recorded on the basis of the output signal of said second multiplier;

a synchronous generator means for synchronizing storage of the fist holographic information data of the object in said first light modulator with storage of the second holographic information data of the object in said second light modulator;

a read-out light source for emitting a read-out light beam to said first and second spatial light modulators; and a phase modulating means for generating a phase difference of $\pi/2+2n\pi$ (wherein n is an integer not less than 0) between the read-out light beam modulated by said first spatial light modulator and the read-out light beam modulated by said second spatial light modulator, wherein the read-out light beam modulated by the first spatial light modulator and the read-out light beam modulated by said second spatial light modulator are combined together so as to reproduce the image of the object on the basis of the first and second holographic information data of the object.

8. A twin-image elimination apparatus according to claim 1, wherein said holographic reconstruction means comprises:

a first memory means which stores a first holographic information data of the object based on the output signal of said first multiplier;

a second memory means which stores a second holographic information data of the object based on the output signal of said second multiplier;

a processing means for adding the first holographic information data of the object stored in said first memory means to the second image information data of the object stored in said second memory means with a phase difference of $\pi/2+2n\pi$ (wherein n is an integer not less than 0); and a display device which converts an output electric signal of said processing means into an image so as to be displayed as the image of the object thereon.

9. A twin-image elimination apparatus according to claim 8, further comprising:

a transmitter for transmitting the output electric signal of said processing means; and a receiver which receives the output electric signal of said processing means transmitted by said transmitter and outputs thus received signal to said display device.

10. A twin-image elimination apparatus according to claim 1, wherein said first multiplier multiplies the output signal of said photodetector by a cosine signal having an angular frequency which coincides with a difference in angular frequency between the spherical and plane waves generated by said interference means, thereby converting the output signal of said photodetector into the cosine-coded holographic information, and said second multiplier multiplies the output signal of said photodetector by a sine signal having an angular frequency which coincides with the difference in angular frequency between the spherical and plane waves generated by said interference means, thereby converting the output signal of said photodetector into the sine-coded holographic information.

11. A twin-image elimination method comprising:

a first step in which an object-scanning light beam emitted from a scanning light source is converted, by an interference means, into a spherical wave and a plane wave which have temporal frequencies different from each other, and the spherical and plane waves are combined together by said interference means;

a second step in which an object is scanned by a scanner with the combined light beam emitted from said interference means;

a third step in which a scattered wave emitted from the object is detected by a photodetector, and an output signal of said photodetector is converted into a cosine-coded holographic information by a first multiplier, while the output signal of said photodetector is converted into a sine-coded holographic information by a second multiplier; and a fourth step in which output signals of said first and second multipliers are converted into a sum signal, in which the output signals of said first and second multipliers are added together with a phase difference of $\pi/2+2n\pi$ (wherein n is an integer not less than 0) by a holographic reconstruction means, so as to reproduce an image of the object.

12. A twin-image elimination method according to claim 11, wherein said fourth step comprises:

a first sub-step in which a first holographic information data of the object is recorded by a first spatial light modulator on the basis of the output signal of said first multiplier, while a second holographic information data of the object is recorded by a second spatial light modulator on the basis of the output signal of said second multiplier;

a second sub-step in which a read-out light beam emitted from a read-out light source is modulated by said first and second spatial light modulators, while a phase control means generates a phase difference of $\pi/2+2n\pi$ (wherein n is an integer not less than 0) between the read-out light beam modulated by said first spatial light modulator and the read-out light beam modulated by said second spatial light modulator; and a third sub-step in which the read-out light beams modulated by said first and second spatial light modulators are combined together so as to reproduce or reconstruct an image of the object on the basis of the first and second holographic information data of the object.

13. A twin-image elimination method according to claim 12, wherein, in the second sub-step of said fourth step, the read-out light beam from said read-out light source is divided into two branched beams by an optical beam splitter and the two branched light beams are respectively output to said first and second spatial light modulators, and wherein, in the third sub-step of said fourth step, said optical beam splitter receives and combines the two branched light beams emitted from said first and second spatial light modulators.

14. A twin-image elimination method according to claim 13, wherein, in the second sub-step of said fourth step, said phase modulating means changes the phase of the read-out light beam emitted from said read-out light source by $\pi/4$ each time the read-out light beam passes through one of a space between said first spatial light modulator and said optical beam splitter and a space between said second spatial light modulator and said optical beam splitter.

15. A twin-image elimination method according to claim 12, wherein, in the first sub-step of said fourth step, storage of the first and second holographic information data of the object in said first and second spatial light modulators is synchronized, by a control means, with scanning of the object with the combined beam emitted from the interference means by said scanner.

16. A twin-image elimination method according to claim 11, wherein, in said third step, a transmitter transmits the output signal of said photodetector to a receiver and then the receiver outputs the output signal of said photodetector to said first and second multipliers.

17. A twin-image elimination method according to claim 16, wherein said fourth step comprises:

a first sub-step in which a first holographic information data of the object is recorded by a first spatial light modulator on the basis of the output signal of said first multiplier, while a second holographic information data of the object is recorded by a second spatial light modulator on the basis of the output signal of said second multiplier, and storage of the first holographic information data of the object in said first light modulator is synchronized, by a synchronous generator means, with storage of the second holographic information data of the object in said second light modulator;

a second sub-step in which a read-out light beam emitted from a read-out light source is modulated by said first and second spatial light modulators, while a phase control means generates a phase difference of $\pi/2+2n\pi$ (wherein n is an integer not less than 0) between the read-out light beam modulated by said first spatial light modulator and the read-out light beam modulated by said second spatial light modulator; and a third sub-step in which the read-out light beams modulated by said first and second spatial light modulators are combined together so as to reproduce an image of the object on the basis of the first and second holographic information data of the object.

18. A twin-image elimination method according to claim 11, wherein said fourth step comprises:

a first sub-step in which the output signal of said first multiplier is stored as a first holographic information data of the object by a first memory means, while the output signal of said second multiplier is stored as a second holographic information data of the object in a second memory means;

a second sub-step in which the first holographic information of the object read out from said first memory means and the second holographic information of the object read out from said second memory means are added together by a processing means with a phase difference of $\pi/2+2n\pi$ (wherein n is an integer not less than 0); and a third sub-step in which an output electric signal of said processing means is converted into an image by a display device so as to be displayed as the image of the object thereon.

19. A twin-image elimination method according to claim 18, wherein, in the third sub-step of the fourth step, a transmitter transmits the output electric signal of said processing means to a receiver and then the receiver outputs the output electric signal of said processing means to said display device.

20. A twin-image elimination method according to claim 11, wherein, in said third step, said first multiplier multiplies the output signal of said photodetector by a cosine signal having an angular frequency which coincides with a difference in angular frequency between the spherical and plane waves generated by said interference means, thereby converting the output signal of said photodetector into the cosine-coded holographic information, and said second multiplier multiplies the output signal of said photodetector by a sine signal having an angular frequency which coincides with the difference in angular frequency between the spherical and plane waves generated by said interference means, thereby converting the output signal of said photodetector into the sine-coded holographic information.

* * * * *